Feb. 9, 1943.  H. MOLOW  2,310,491
SANITARY CONCEALED CUP FOR BOTTLE AND CAN CAPS
Filed June 20, 1940
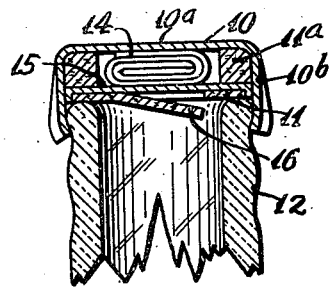
Fig.1.
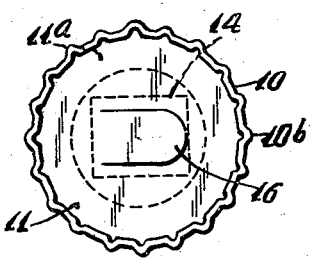
Fig.2.
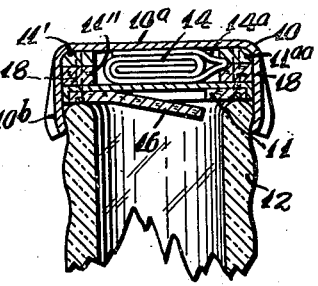
Fig.5.
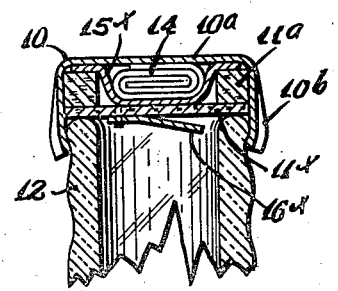
Fig.7.
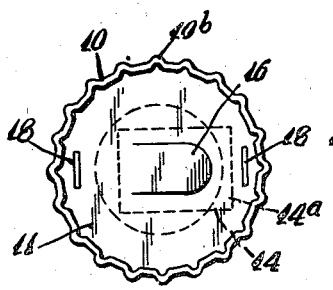
Fig.6.
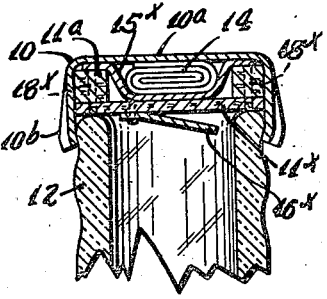
Fig.9.
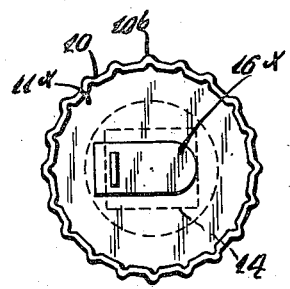
Fig.8.
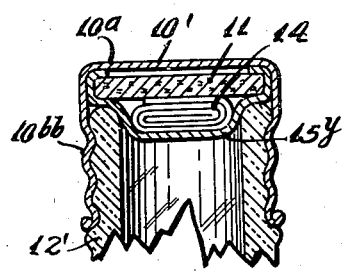
Fig.11.
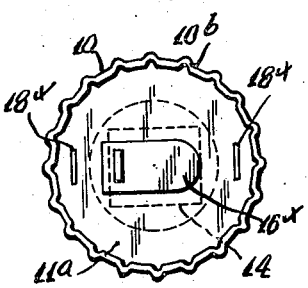
Fig.10.
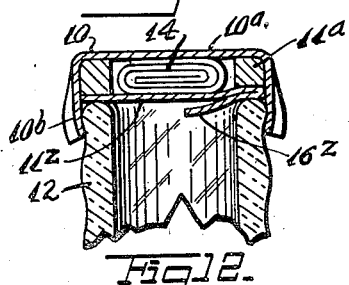
Fig.12.
Fig.3.
Fig.13.
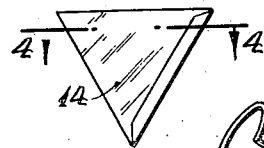
Fig.4.
INVENTOR
Henry Molow
BY
ATTORNEY Patented Feb. 9, 1943

2,310,491

UNITED STATES PATENT OFFICE 2,310,491

SANITARY CONCEALED CUP FOR BOTTLE AND CAN CAPS

Henry Molow, Brooklyn, N. Y.

Application June 20, 1940, Serial No. 341,408

3 Claims. (Cl. 215—38)

This invention relates to new and useful improvements in a sanitary concealed cup for bottle and can caps.

The invention is characterized by a cap shell having a top wall and a skirt wall and adapted to engage on the neck of a bottle or can. It is proposed that a cork seal or other seal be arranged within the shell for coaction with the neck of the bottle or can for sealing the latter. It is contemplated that a folded cup be disposed within the cap shell. Furthermore, it is proposed that a cup seal be provided for protecting the folded cup so that it does not become wet from the liquid in the bottle or can.

The invention has for a further object the provision of an element, such as a handle, for assisting in the manual removal of the seals and the folded cup from the shell so that the cup may be opened and used.

The invention is particularly intended for beverages and liquids which are consumed from cups, glasses and the like.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a vertical sectional view of a sanitary concealed cup for bottle and can caps, illustrated applied upon the neck of a bottle.

Fig. 2 is a bottom elevational view of the cap per se.

Fig. 3 is a side elevational view of the cup, per se, illustrated in an open condition.

Fig. 4 is a horizontal sectional view taken on the line 4—4 of Fig. 3.

Fig. 5 is a vertical sectional view of a sanitary concealed cup on the neck of a bottle, and constructed in accordance with another form of this invention.

Fig. 6 is a bottom elevational view of the cap shown in Fig. 5.

Fig. 7 is another vertical sectional view of a sanitary concealed cup for bottle and can caps constructed in accordance with another form of this invention, and applied on the neck of a bottle.

Fig. 8 is a bottom elevational view of the cap shown in Fig. 7.

Fig. 9 is another vertical sectional view of a sanitary concealed cup constructed in accordance with this invention and shown applied on a bottle.

Fig. 10 is a bottom elevational view of a cap shown in Fig. 9.

Fig. 11 is another vertical sectional view of a sanitary concealed cup for bottle and can caps constructed in accordance with another form of this invention and shown applied on the neck of a bottle.

Fig. 12 is another view similar to Fig. 1, but illustrating another form of the invention.

Fig. 13 is a perspective view of the seal element shown in Fig. 12.

The sanitary concealed cup for bottles and can caps, in accordance with this invention, includes a cap shell $10$ having a top wall $10^a$ and a skirt wall $10^b$. A cork seal $11$ is disposed within the shell $10$ for coaction with the neck $12$ of a bottle or can for sealing the latter. A folded cup $14$ is disposed within the shell $10$. A cup seal $15$ is provided for protecting the folded cup $14$ from being wetted by liquid within the bottle or can. An element $16$ is provided for assisting in the manual removal of the seals and the folded cup $14$ from the shell $10$ so that the cup may be opened and used.

The shell $10$ may comprise the usual crown cap or other type of cap. The cork seal $11$ comprises the usual disc of cork found within a crown cap. However, this cork seal $11$ is used in combination with a complementary cork seal annular member $11^a$ rested against the bottom face of the top wall $10^a$ of the cap $10$. The folded cup $14$ is disposed within the circular opening of the annular cork seal $11^a$. The cup seal $15$ comprises a sheet of tinfoil or other waterproof material. It has its edge portions clamped in between the edges of the cork seal $11$ and complementary cork annular seal $11^a$.

The element $16$ comprises a tongue stamped from the material of the cork seal $11$. The cup $14$ preferably is formed from lightweight "Cellophane" or other waterproof sheet material. As illustrated in Figs. 3 and 4 the cup is of conical shape when opened. However, it may be of any design. The cup illustrated in Figs. 3 and 4 may first be folded into strip formation and then this formation folded into a smaller compass. In this condition it is placed within the central opening of the annular cork seal $11^a$.

The use of the article may be understood by examining Fig. 1 and noting that the cap $10$ which is pressed tightly upon the top of the neck $12$ serves to force together the edge portions of the cork seal $11$, the cup seal $15$, and the annular cork seal 11ª. This produces a liquid tight seal. The cup is protected from becoming wet by liquid within the bottle having the neck 12, by the seal 15.

In Figs. 5 and 6 a modified form of the invention is illustrated which distinguishes from the prior form in the fact that several staples 18 have been used to secure together the various seals from which the article is composed. More specifically, the staples 18 secure together the cork seal 11 and the annular cork seal 11ªª. The annular cork seal 11ªª is formed from separate annual sections 11' and 11". A small portion 14ª of the folded cup 14 is clamped in between the adjacent sections 11' and 11". The staples 18 also engage through the sections 11' and 11". When the cap is removed from the neck of the bottle, the handle 16 may be pulled for removing the seals and the cup 14 as a unit from the cap shell 10. Then the cup 14 may be pulled out from this unit and opened up and used.

In Figs. 7 and 8 another form of the invention is disclosed which distinguishes from the form illustrated in Figs. 1-4 in the fact that the cork seal 11ˣ supports a separate element or tab 16ˣ which may be used to remove the seals from the shell cap 10. The cup seal 15ˣ has its edge portions clamped in between the auxiliary annular cork seal 11ª and the top wall 10ª of the shell 10. In other respects this form of the invention is similar to the previous form.

In Figs. 9 and 10 another form of the invention has been disclosed which is very similar to the form shown in Figs. 7 and 8, distinguishing merely in the fact that several staples 18ˣ have been engaged through the several seals within the cap 10 to connect them together as a unit. Thus when the cap is removed and the handle element 16ˣ is pulled, the seals will be drawn out from the shell 10 as a unit. Then the cup 14 may readily be removed and opened. In other respects this form of the invention is similar to the previous forms.

In Fig. 11 another form of the invention has been disclosed in which the cap shell 10' has a top wall 10ª and a skirt wall 10ᵇᵇ. This skirt wall is formed with threads which threadedly engage upon the neck 12' of a bottle, can or the like. The cork seal 11 is mounted within the cap. The cup 14 is disposed upon the bottom of the cork seal 11. The cup seal 15ʸ is engaged beneath the cup 14 and has its edge portions extending upwardly around the edges of the cork seal 11. In other respects this form of the invention is similar to the previous forms.

When the cap 10' is removed from the neck 12' a fork, or spoon, or other element may be inserted into the cap to break the cup shell 15ʸ, which is fragile, being preferably constructed of metal foil. Then the cup 14 is easily removed and opened.

In Fig. 12, the seal 11ˣ is preferably made of waterproof sheet material and is formed with an integral tab element 16ˣ which may be used to remove the seals from the shell cap 10, after the cap 10 is removed from the bottle neck 12. When the seal 11ˣ is removed, the folded cup 14 may be withdrawn from the center area of the annular cork seal 11ª.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A device of the class described, comprising a cap shell having a top wall and a skirt wall and engageable with the neck opening of a bottle for closing the same, an annular cork seal mounted within said cap shell and having a central opening forming a storage compartment, a disc shaped seal extended across said cork seal and engaging the neck opening of said bottle for sealing the same, and a seal extended across the top face of said disc shaped seal for sealing said storage compartment to prevent liquid from said bottle from entering said compartment.

2. A device of the class described, comprising a cap shell having a top wall and a skirt wall and engageable with the neck opening of a bottle for closing the same, an annular cork seal mounted within said cap shell and having a central opening forming a storage compartment, a disc shaped seal extended across said cork seal and engaging the neck opening of said bottle for sealing the same, and a seal extended across the top face of said disc shaped seal for sealing said storage compartment to prevent liquid from said bottle from entering said compartment, said latter seal having its edges engaged between the top face of said annular cork seal and the inner face of the top wall of said cap shell.

3. A device of the class described, comprising a cap shell having a top wall and a skirt wall and engageable with the neck opening of a bottle for closing the same, an annular cork seal mounted within said cap shell and having a central opening forming a storage compartment, a disc shaped seal extended across said cork seal and engaging the neck opening of said bottle for sealing the same, and a seal extended across the top face of said disc shaped seal for sealing said storage compartment to prevent liquid from said bottle from entering said compartment, said latter seal having its edges engaged between the top face of said disc shaped seal and the bottom face of said annular cork seal.

HENRY MOLOW.